(12) United States Patent
Yao et al.

(10) Patent No.: US 11,967,134 B2
(45) Date of Patent: Apr. 23, 2024

(54) METHOD AND DEVICE FOR IDENTIFYING VIDEO

(71) Applicants: Beijing Jingdong Shangke Information Technology Co., Ltd., Beijing (CN); Beijing Jingdong Century Trading Co., Ltd., Beijing (CN)

(72) Inventors: Ting Yao, Beijing (CN); Tao Mei, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 353 days.

(21) Appl. No.: 17/611,673

(22) PCT Filed: Mar. 19, 2020

(86) PCT No.: PCT/CN2020/080264
§ 371 (c)(1),
(2) Date: Nov. 16, 2021

(87) PCT Pub. No.: WO2020/244279
PCT Pub. Date: Dec. 10, 2020

(65) Prior Publication Data
US 2022/0215649 A1    Jul. 7, 2022

(30) Foreign Application Priority Data
Jun. 5, 2019   (CN) .......................... 201910485621.6

(51) Int. Cl.
G06K 9/00    (2022.01)
G06V 10/40   (2022.01)
(Continued)

(52) U.S. Cl.
CPC ............ *G06V 10/764* (2022.01); *G06V 10/40* (2022.01); *G06V 10/82* (2022.01)

(58) Field of Classification Search
CPC . G06T 2207/20084; G06T 2207/20081; G06T 5/70; G06T 17/00; G06T 19/20;
(Continued)

(56) References Cited

U.S. PATENT DOCUMENTS

2012/0008673 A1    1/2012 Suresh
2016/0300352 A1*   10/2016 Raj ...................... G06V 10/764
2019/0005330 A1    1/2019 Uhlenbrock et al.

FOREIGN PATENT DOCUMENTS

CN    105740773 A    7/2016
CN    106022310 A    10/2016
(Continued)

OTHER PUBLICATIONS

Zhou D, Zheng L, Xu J and He J, Misc-GAN: A Multi-scale Generative Model for Graphs. 2019, Frontier Big Data (Year: 2019).*
(Continued)

*Primary Examiner* — Alex Kok S Liew
(74) *Attorney, Agent, or Firm* — Buchanan Ingersoll & Rooney PC

(57) ABSTRACT

Disclosed are a method and device for recognizing a video. One specific embodiment of the method comprises: obtaining a video to be identified; inputting said video to a pre-trained local and global representation propagation LGD model to obtain the category of said video, wherein the LGD model learns a spatial-temporal representation in said video based on diffusion between local and global representations. According to this embodiment, the spatial-temporal representation in the video is learned based on diffusion between the local and global representations.

19 Claims, 6 Drawing Sheets

(51) Int. Cl.
*G06V 10/764* (2022.01)
*G06V 10/82* (2022.01)

(58) Field of Classification Search
CPC . G06T 2207/10024; G06T 2207/10016; G06T 5/50; G06T 19/006; G06T 2207/10028; G06T 2207/20016; G06T 2207/20076; G06T 3/4007; G06T 15/04; G06T 15/06; G06T 15/50; G06T 2207/10081; G06T 2207/30196; G06T 2210/41; G06T 2219/2004; G06N 3/045; G06N 3/08; G06N 3/084; G06N 3/047; G06N 3/088; G06N 3/0455; G06N 3/048; G06N 3/04; G06N 3/063; G06N 7/01; G06N 3/044; G06N 20/00; G06N 20/10; G06N 20/20; G06N 3/09; G06N 3/042; G06N 3/02
See application file for complete search history.

(56) References Cited

FOREIGN PATENT DOCUMENTS

| CN | 106056082 A | 10/2016 |
|---|---|---|
| CN | 106650674 A | 5/2017 |
| CN | 108133188 A | 6/2018 |
| CN | 108241849 A | 7/2018 |
| CN | 108416288 A | 8/2018 |
| CN | 108604303 A | 9/2018 |
| CN | 108960140 A | 12/2018 |
| CN | 109472248 A | 3/2019 |

OTHER PUBLICATIONS

Ren, Multiscale Structure Guided Diffusion for Image Deblurring, 2023, CVPR (Year: 2023).*
Libin Jiao, Hao Wu, Haodi Wang, Rongfang Bie, Multi-scale semantic image inpainting with residual learning and GAN, Neurocomputing, Feb. 2019, Science Direct (Year: 2019).*
Hu, ProstateGAN: Mitigating Data Bias via Prostate Diffusion Imaging Synthesis with Generative Adversarial Networks, Nov. 2018 ( Year: 2018).*
Chinese Office Action for Chinese Application No. 201910485621. 6, dated Sep. 24, 2020, 6 pages.
International Search Report and Written Opinion for International Application No. PCT/CN2020/080264, dated Jun. 23, 2020, 6 pages.
Höynck et al., "Robust Object Region Detection in Natural Video using Motion Estimation and Region-Based Diffusion", Picture Coding Symposium, Institute of Communications Engineering, Dec. 15, 2004, 6 pages, XP030080149.
Wang et al., "Non-local Neural Networks", 2018 IEEE/CVF Conference on Computer Vision and Pattern Recognition, IEEE, Jun. 18, 2018, pp. 7794-7803, XP033473700, [retrieved on Dec. 14, 2018].

* cited by examiner

METHOD AND DEVICE FOR IDENTIFYING VIDEO

CROSS-REFERENCE TO RELATED APPLICATIONS

This patent application is a U.S. National Stage of International Application No. PCT/CN2020/080264, filed on Mar. 19, 2020, which claims the priority from Chinese Patent Application No. 201910485621.6, filed on Jun. 5, 2019. Both of the aforementioned applications are hereby incorporated by reference in their entireties.

TECHNICAL FIELD

Embodiments of the present disclosure relate to the field of computer technology, and particularly to a method and apparatus for recognizing a video.

BACKGROUND

Currently, digital content is itself multimedia. In particular, with the proliferation of sensor-rich mobile devices, images and videos become media in daily communication. Therefore, the understanding for multimedia content becomes very important, which accelerates the development of various technologies in the visual field. Here, the fundamental breakthrough for the success of these technologies is representation learning. This can be proved by the success of a convolutional neural network (CNN), which demonstrates a high learning capability and a high generality in visual representations.

The natural extension from an image domain to a video domain is implemented by directly applying a two-dimensional convolutional neural network (2D CNN) on a video frame or applying a three-dimensional convolutional neural network (3D CNN) on a video segment.

SUMMARY

Embodiments of the present disclosure propose a method and apparatus for recognizing a video.

According to a first aspect, some embodiments of the present disclosure provide a method for recognizing a video, including: acquiring a to-be-recognized video; and inputting the to-be-recognized video into a pre-trained local and global diffusion (LGD) model to obtain a category of the to-be-recognized video, the LGD model learning a spatiotemporal representation in the to-be-recognized video based on diffusion between a local representation and a global representation.

According to a second aspect, some embodiments of the present disclosure provide an apparatus for recognizing video, including: an acquiring unit, configured to acquire a to-be-recognized video; a recognizing unit, configured to input the to-be-recognized video into a pre-trained local and global diffusion (LGD) model to obtain a category of the to-be-recognized video, the LGD model learning a spatiotemporal representation in the to-be-recognized video based on diffusion between a local representation and a global representation.

According to a third aspect, some embodiments of the present disclosure provide a server, the server includes: one or more processors; and a storage apparatus, configured to store one or more programs, where the one or more programs, when executed by the one or more processors, cause the one or more processors to implement the method according to any one of the implementations in the first aspect.

According to a fourth aspect, some embodiments of the present disclosure provide a computer readable medium, storing a computer program thereon, where the computer program, when executed by a processor, implements the method according to any one of the implementations in the first aspect.

BRIEF DESCRIPTION OF THE DRAWINGS

After reading detailed descriptions of non-limiting embodiments given with reference to the following accompanying drawings, other representations, objectives and advantages of the present disclosure will be more apparent.

DETAILED DESCRIPTION OF EMBODIMENTS

The present disclosure is further described below in detail by combining the accompanying drawings and the embodiments. It may be appreciated that embodiments described herein are merely used for explaining the relevant disclosure, rather than limiting the disclosure. In addition, it should also be noted that, for ease of description, only the parts related to the relevant disclosure are shown in the accompanying drawings.

It should be noted that embodiments in the present disclosure and the features in the embodiments may be combined with each other on a non-conflict basis. Embodiments of the present disclosure will be described below in detail with reference to the accompanying drawings.

Figure 1:
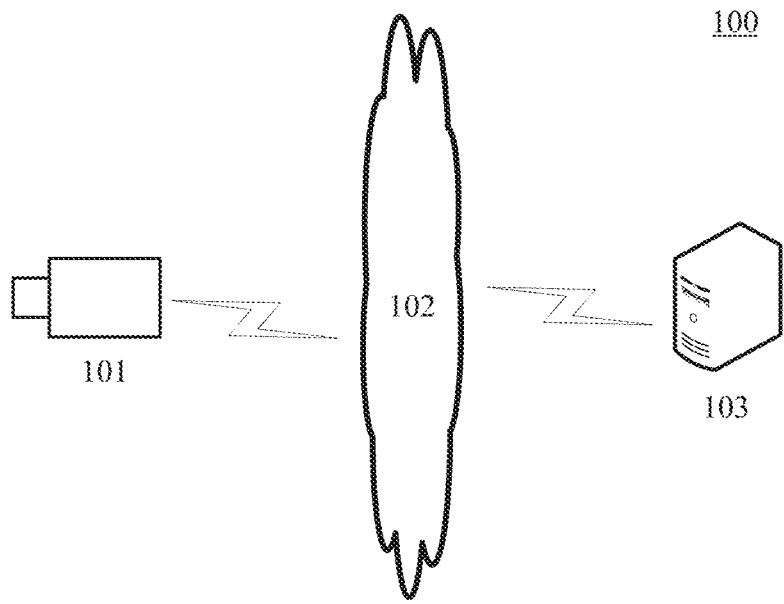
FIG. 1 illustrates an exemplary system architecture in which the present disclosure may be applied.

FIG. 1 illustrates an exemplary system architecture 100 in which a method for recognizing a video or an apparatus for recognizing a video according to an embodiment of the present disclosure may be applied.

As shown in FIG. 1, the system architecture 100 may include a video collection device 101, a network 102 and a server 103. The network 102 serves as a medium providing a communication link between the video collection device 101 and the server 103. The network 102 may include various types of connections, for example, wired or wireless communication links, or optical fiber cables.

The video collection device 101 may send a motion video collected by the video collection device 101 to the server 103 via the network 102. The video collection device 101 may be hardware or software. When being the hardware, the video collection device 101 may be various electronic devices supporting a video collection function, the electronic devices including, but not limited to, a webcam, a video camera, a camera, a smartphone, etc. When being the software, the video collection device 101 may be installed in the above listed electronic devices. The video collection device may be implemented as a plurality of pieces of software or a plurality of software modules, or as a single piece of software or a single software module, which will not be specifically defined here.

The server 103 may be a server providing various services, for example, a video recognition server. The video recognition server may process, e.g., analyze, acquired data such as a to-be-recognized video, to generate a processing result (e.g., a category of the to-be-recognized video).

It should be noted that the server 103 may be hardware or software. When being the hardware, the server 103 may be implemented as a distributed server cluster composed of a plurality of servers, or as a single server. When being the software, the server 103 may be implemented as a plurality of pieces of software or a plurality of software modules (e.g., software or software modules for providing a distributed service), or as a single piece of software or a single software module, which will not be specifically defined here.

It should be noted that the method for recognizing a video provided by the embodiments of the present disclosure is generally performed by the server 103. Correspondingly, the apparatus for recognizing a video is generally provided in the server 103.

It should be appreciated that the numbers of the video collection devices, the networks and the servers in FIG. 1 are merely illustrative. Any number of video collection devices, networks, and servers may be provided based on actual requirements.

Figure 2:
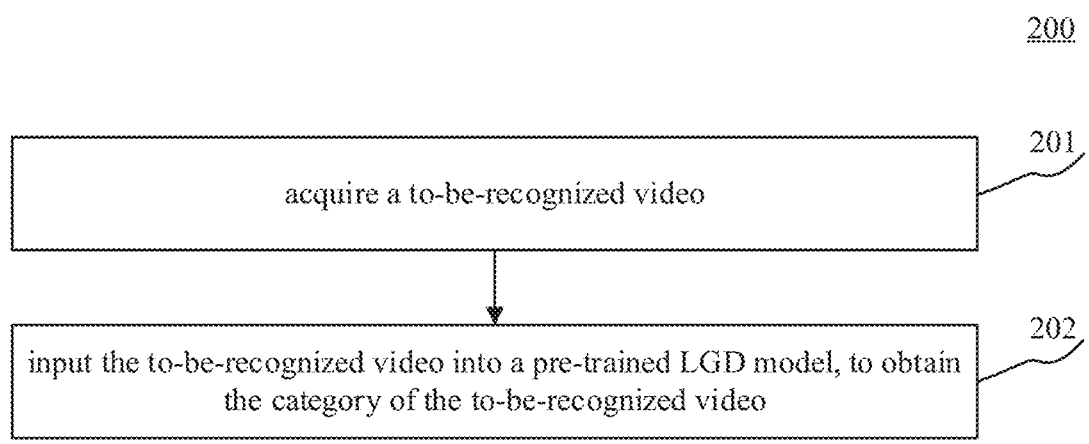
FIG. 2 is a flowchart of an embodiment of a method for recognizing a video according to the present disclosure.

Further referring to FIG. 2, FIG. 2 illustrates a flow 200 of a method for recognizing a video according to an embodiment of the present disclosure. The method for recognizing a video includes the following steps:

Step 201, acquiring a to-be-recognized video.

In this embodiment, an executing body (e.g., the server 103 shown in FIG. 1) of the method for recognizing a video may acquire, from a video collection device (e.g., the video collection device 101 shown in FIG. 1), a video collected by the video collection device as the to-be-recognized video. Here, the to-be-recognized video may be a video containing any content, and the content may include, but not limited to, a motion, an activity, an event, and the like.

Step 202, inputting the to-be-recognized video into a pre-trained LGD model to obtain a category of the to-be-recognized video.

In this embodiment, the above executing body may input the to-be-recognized video into the pre-trained LGD (local and global diffusion) model, to obtain the category of the to-be-recognized video.

In this embodiment, the LGD model may learn a spatio-temporal representation in a video based on diffusion between a local representation and a global representation. Particularly, the LGD model may be a novel three-dimensional neural network structure, which is used to synchronously learn the local representation and the global representation in the to-be-recognized video. Generally, this structure consists of basic LGD modules. Here, each LGD module may simultaneously update the local representation and the global representation based on the diffusion between the local representation and the global representation. Both local information and global information are effectively combined through this diffusion operation, thus obtaining a more robust video representation expression.

According to the method for recognizing a video provided in the embodiment of the present disclosure, the to-be-recognized video is first acquired. Then, the to-be-recognized video is inputted into the pre-trained LGD model, to obtain the category of the to-be-recognized video. The spatio-temporal representation in the video is learned based on the diffusion between the local representation and the global representation, thereby improving the accuracy of the recognition for the video.

Figure 3:
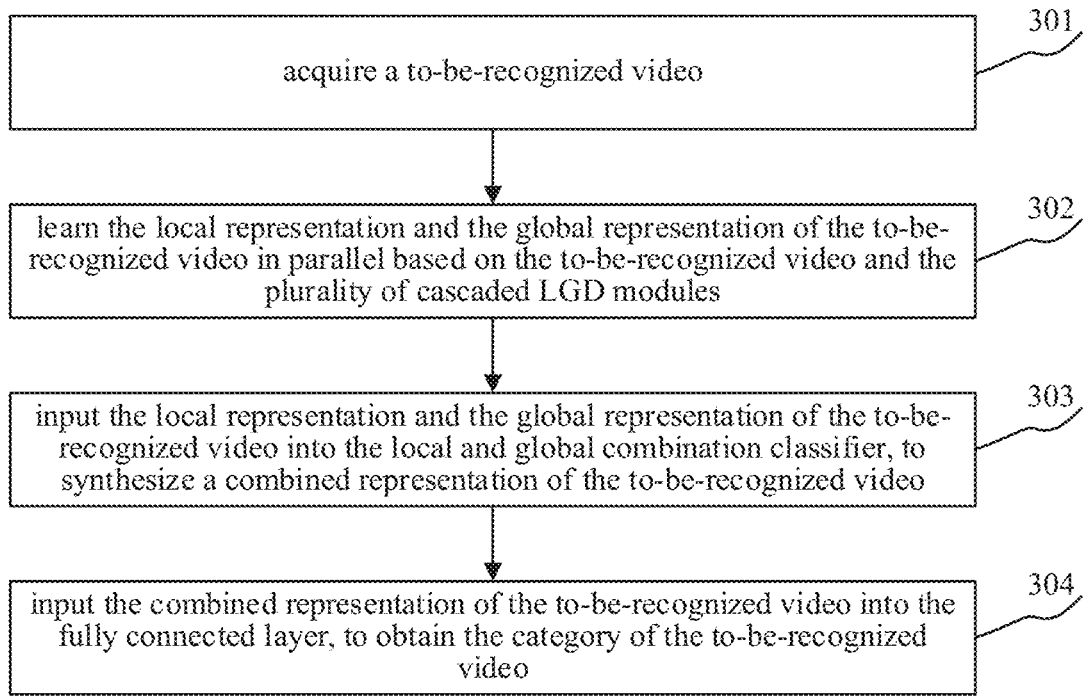
FIG. 3 is a flowchart of another embodiment of the method for recognizing a video according to the present disclosure.

Further referring to FIG. 3, FIG. 3 illustrates a flow 300 of a method for recognizing a video according to another embodiment of the present disclosure.

In this embodiment, an LGD model may include a plurality of cascaded LGD modules, a local and global combination classifier and a fully connected layer.

In this embodiment, the method for recognizing a video may include the following steps:

Step 301, acquiring a to-be-recognized video.

In this embodiment, the detailed operation of step 301 is already described in detail in step 201 in the embodiment shown in FIG. 2, which will not be repeatedly described here.

Step 302, learning a local representation and a global representation of the to-be-recognized video in parallel based on the to-be-recognized video and a plurality of cascaded LGD modules.

In this embodiment, an executing body (e.g., the server 103 shown in FIG. 1) of the method for recognizing a video may process the to-be-recognized video by using the plurality of cascaded LGD modules, to learn the local representation and the global representation of the to-be-recognized video in parallel. Here, the LGD modules may include two different structures, called LGD-2D and LGD-3D, having different local transform functions and different training strategies. Particularly, the structures will be described in the embodiments shown in FIGS. 6 and 8.

Figure 4:
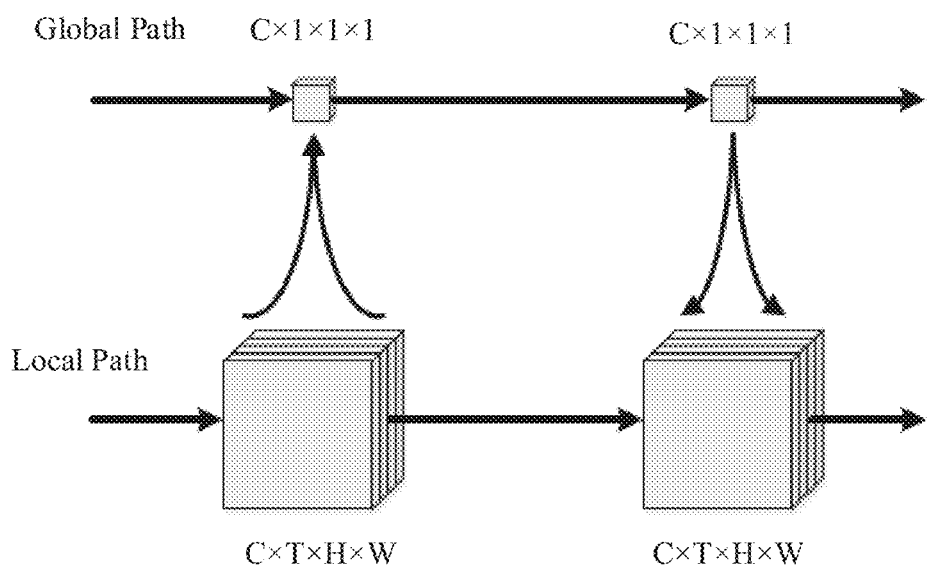
FIG. 4 is a schematic structural diagram of an LGD module.

In some alternative implementations of this embodiment, each LGD module may include a local path and a global path that interact with each other, to be used to describe local variation and holistic appearance at each spatio-temporal location. For ease of understanding, FIG. 4 illustrates a schematic structural diagram of an LGD module. Here, the LGD module may be a unit having a local path and a global path that interact with each other. In this way, an LGD model including a plurality of cascaded LGD modules is a dual-path network, which is intended to simulate local and global video information. According to the diffusion between the two paths, the correlation of a remote pixel can be efficiently captured through the learned video representations.

In some alternative implementations of this embodiment, the diffusion directions in each LGD module may include a global-to-local diffusion direction and a local-to-global diffusion direction. Here, in the global-to-local diffusion direction, a local feature map at a current LGD module is learned based on a local feature map at a preceding LGD module and a global feature vector at the preceding LGD module. For example, a residual value of a global path at the preceding LGD module is attached to the local feature map of the preceding LGD module, to generate the local feature map at the current LGD module. Here, in the local-to-global diffusion direction, a global feature vector at the current LGD module is learned based on the local feature map at the current LGD module and the global feature vector at the preceding LGD module. For example, the global feature vector at the preceding LGD module and global average pooling of the local feature map at the current LGD module are linearly embedded, to generate the global feature vector at the current LGD module.

For example, the LGD module may simulate the interaction between the two paths through the following formula:

$$\{x_l, g_l\} = B(\{x_{l-1}, g_{l-1}\}).$$

Here, l is a positive integer, denoting an l-th LGD module in the plurality of cascaded LGD module $\{x_{l-1}, g_{l-1}\}$ denotes an output pair of an (l−1)-th LGD module, which is also used as an input pair of the l-th LGD module. $\{x_l, g_l\}$ denotes an output pair of the l-th LGD module. $x_l \in \mathbb{R}^{C \times T \times H \times W}$ denotes the local feature map output by the l-th LGD module. $g_l \in \mathbb{R}^C$ denotes a global feature vector output by the l-th LGD module. C, T, H and W are respectively the number of channels, temporal length, height and width of 4D data. $\mathbb{R}^{C \times T \times H \times W}$ denotes a vector group consisting of all vectors in the dimension of C×T×H×W. $\mathbb{R}^C$ denotes a vector group consisting of all vectors in the dimension of C. B denotes a detailed operation inside the LGD module.

Figure 5:
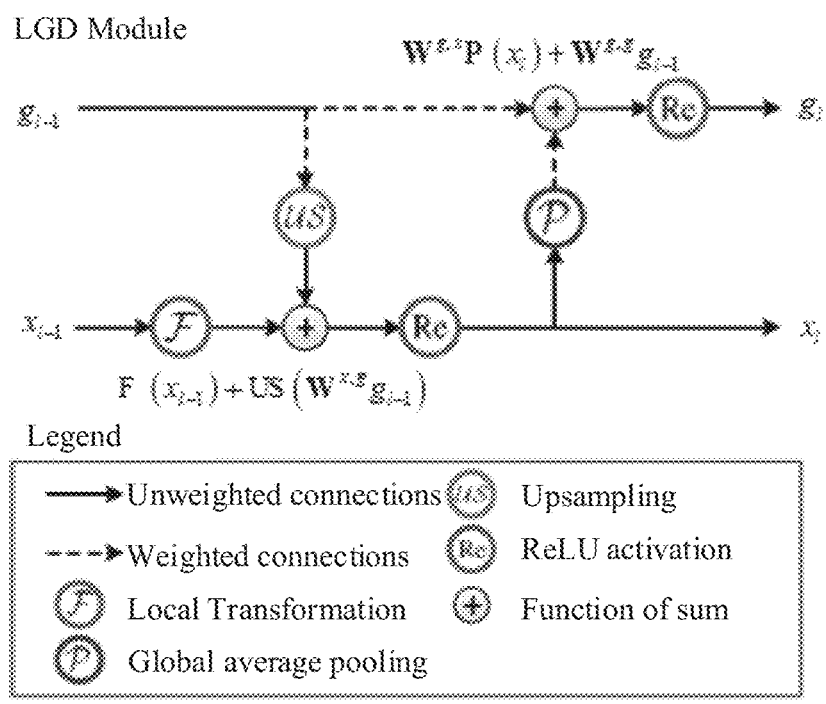
FIG. 5 is a schematic diagram of learning of an LGD module.

For ease of understanding, FIG. 5 is a schematic diagram of learning of an LGD module. Here, the detailed operation inside each B block may be decomposed into the following two diffusion directions.

One is a global-to-local diffusion direction. This direction is to learn the transformation from a local feature map $x_{l-1}$ to the updated local feature map $x_l$ with the priority of global feature vector $g_{l-1}$. The objective is to formulate the global priority as the global residual value. The global residual value may be broadcasted to each location through the following formula:

$$x_l = \text{ReLU}(\mathcal{F}(x_{l-1}) + \mathcal{US}(W^{x,g} g_{l-1})).$$

Here, $W^{x,g} \in \mathbb{R}^{C \times C}$ is the projection matrix. $\mathbb{R}^{C \times C}$ is a vector group consisting of all vectors in a dinemsion of C×C. $\mathcal{US}$ is an up-sampling operation duplicating the residual vector to each location $\mathcal{F}$ is a local transformation function (i.e., 3D convolutions). The choice of the function $\mathcal{F}$ is dependent on the network architecture. ReLU is a linear rectification function (also called a rectified linear unit), which is an activation function commonly used in an artificial neural network and generally refers to a nonlinear function expressed by a ramp function and variants thereof.

The other one is a local-to-global diffusion direction. This direction is to update a global feature variable $g_l$ with the local feature map $x_l$. Here, the global feature vector $g_{l-1}$ and global average pooling (GAP) of the local feature map $x_l$ are linearly embedded through the following formula:

$$g_l = \text{ReLU}(W^{g,x} \mathcal{P}(x_l) + W^{g,g} g_{l-1}).$$

Here, $W^{g,x} \in \mathbb{R}^{C \times C}$ and $W^{g,g} \in \mathbb{R}^{C \times C}$ are projection matrices combining local and global representations. $\mathcal{P}(x_l)$ is the global average pooling (GAP) of the local feature map $x_l$.

In some alternative implementations of this embodiment, each LGD module may produce a local feature map and a global feature vector through at least three projection matrices (e.g., $W^{x,g}$, $W^{g,x}$ and $W^{g,g}$), and use a low-rank approximation of each projection matrix to reduce the number of additional parameters of the LGD module. For example, the low-rank approximation of the each projection matrix is: $W = W_1 W_2$. Here, $W_1 \in \mathbb{R}^{C \times \hat{C}}$, $W_2 \in \mathbb{R}^{\hat{C} \times C}$, $\mathbb{R}^{C \times \hat{C}}$ is a vector group consisting of all vectors in a dimension of C×Ĉ, and $\mathbb{R}^{\hat{C} \times C}$ is a vector group consisting of all vectors in a dimension of Ĉ×C When Ĉ≪C, the parameters as well as computational cost can be sharply reduced. Through cross-validation, when $$\hat{C} = \frac{C}{16},$$

there would be no negative impact on the performance. Moreover, by this approximation, the number of additional parameters is reduced from $$3C^2 \text{ to } \frac{3}{8} C^2$$

for each LGD module.

Step 303, inputting the local representation and the global representation of the to-be-recognized video into a local and global combination classifier, to synthesize a combined representation of the to-be-recognized video.

In this embodiment, the above executing body may synthesize the local representation and the global representation of the to-be-recognized video by using the local and global combination classifier, to generate the combined representation of the to-be-recognized video. That is, the local and global combination classifier can combine the final representations of the local path and the global path together.

In some alternative implementations of this embodiment, the local and global combination classifier may be a kernel-based classifier.

For example, a kernelized view of similarity measurement between two videos is taken into consideration Formally, $\{x_L, g_L\}$ and $\{x'_L, g'_L\}$ are denoted as the final output pairs of the two videos, a bilinear kernel is chose on both the local and global representations, the bilinear kernel can be trained end-to-end in neural network. Here, the kernel function is given by:

$$k(\{x_L, g_L\}, \{x'_L, g'_L\}) = \langle x_L, x'_L \rangle_2 + \langle g_L, g'_L \rangle_2$$

$$= \frac{1}{N^2} \sum_i \sum_j \langle x_L^j, x'^j_L \rangle_2 + \langle g_L, g'_L \rangle_2$$

$$\approx \frac{1}{N^2} \sum_i \sum_j \langle \varphi(x_L^j), \varphi(x'^j_L) \rangle + \langle \varphi(g_L), \varphi(g'_L) \rangle.$$

Here, N=L×H×W is the number of spatio-temporal locations. $\langle \cdot, \cdot \rangle$ is the bilinear kernal. $x^i_L \in \mathbb{R}^C$ denotes the feature vector of i-th location in $x_L$. The bilinear kernel is approximated by Tensor Sketch Projection φ, the dimension of feature space may be effectively reduced. By decomposing the kernel function, the feature mapping may be formulated as:

$$\varphi(\{x_L, g_L\}) = \left[ \frac{1}{N} \sum_i \varphi(x_L^j), \varphi(g_L) \right].$$

Here, [·,·] denotes concatenation of two vectors. φ($\{x_L, g_L\}$) combines $\{x_L, g_L\}$ into a high dimensional vector. The whole process may be trained end-to-end in the neural networks.

Step 304, inputting the combined representation of the to-be-recognized video into a fully connected layer, to obtain a category of the to-be-recognized video.

In this embodiment, the above executing body may input the combined representation of the to-be-recognized video into the fully connected layer to predict a category tag, to obtain the category of the to-be-recognized video.

It can be seen from FIG. 3 that, as compared with the embodiment corresponding to FIG. 2, the flow 300 of the method for recognizing a video in this embodiment emphasizes the step of recognizing the video. Here, the LGD model in the scheme described in this embodiment may include a plurality of cascaded LGD modules, a local and global combination classifier and a fully connected layer. The plurality of cascaded LGD modules are used to learn the local representation and the global representation of the to-be-recognized video in parallel, the local and global combination classifier is used to synthesize the combined representation of the to-be-recognized video, and the fully connected layer is used to predict the category tag. By combining the local representation and the global representation, the accuracy of the recognition for the video is further improved.

Figure 6:
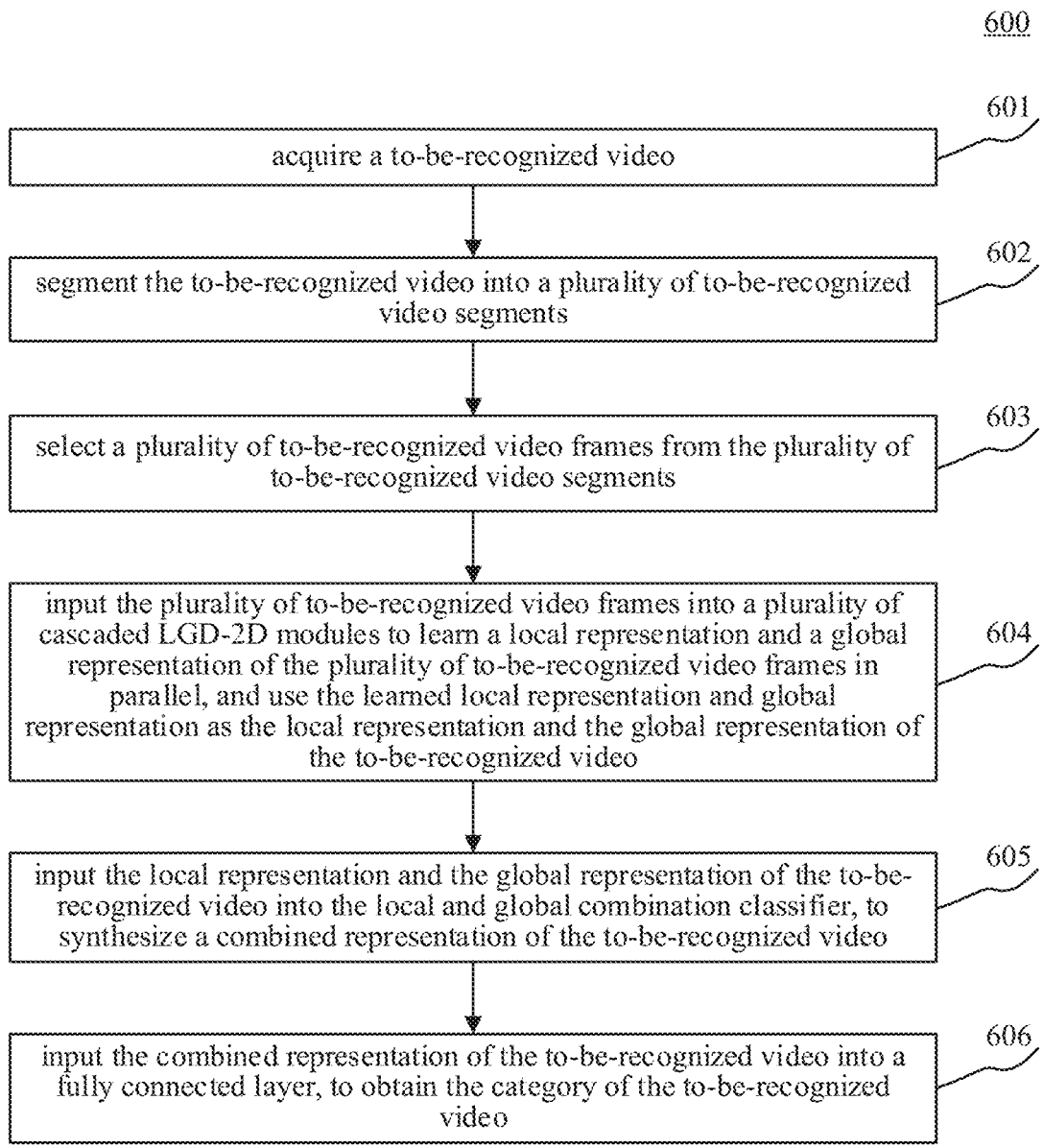
FIG. 6 is a flowchart of another embodiment of the method for recognizing a video according to the present disclosure.

Further referring to FIG. 6, FIG. 6 illustrates a flow 600 of a method for recognizing a video according to another embodiment of the present disclosure.

Figure 7:
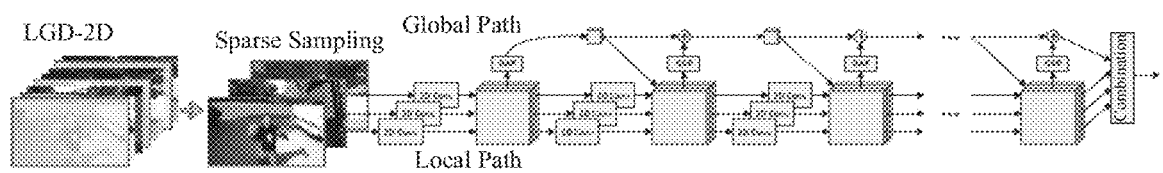
FIG. 7 is a schematic structural diagram of an LGD-2D module.

In this embodiment, an LGD model may include a plurality of cascaded LGD modules, a local and global combination classifier and a fully connected layer. Here, each LGD module is an LGD-2D module. For ease of understanding, FIG. 7 is a schematic structural diagram of a plurality of cascaded LGD-2D modules.

In this embodiment, the method for recognizing a video includes the following steps:

Step 601, acquiring a to-be-recognized video.

In this embodiment, the operation of step 601 is already described in detail in step 301 in the embodiment shown in FIG. 3, which will not be repeatedly described here.

Step 602, segmenting the to-be-recognized video into a plurality of to-be-recognized video segments.

In this embodiment, an executing body (e.g., the server 103 shown in FIG. 1) of the method for recognizing a video may segment the to-be-recognized video into the plurality of to-be-recognized video segments.

Step 603, selecting a plurality of to-be-recognized video frames from the plurality of to-be-recognized video segments.

In this embodiment, the above executing body may select the plurality of to-be-recognized video frames from the plurality of to-be-recognized video segments. Here, the plurality of to-be-recognized video frames may be a plurality of video frames that are not consecutive. Generally, at least one to-be-recognized video frame is selected from each to-be-recognized video segment. For example, inspired by a temporal segment network (TSN), one to-be-recognized video frame is selected from each to-be-recognized video segment.

Step 604, inputting the plurality of to-be-recognized video frames into a plurality of cascaded LGD-2D modules to learn a local representation and a global representation of the plurality of to-be-recognized video frames in parallel, and using the learned local representation and global representation as the local representation and the global representation of the to-be-recognized video.

In this embodiment, the above executing body may input the plurality of to-be-recognized video frames into the plurality of cascaded LGD-2D modules to learn the local representation and the global representation of the plurality of to-be-recognized video frames in parallel, and use the local representation and the global representation as the local representation and the global representation of the to-be-recognized video.

Here, the straightforward way to learn video representation directly employs 2D convolution as the local transformation function F. Thus, in the local path of LGD-2D module, a shared 2D CNN may be performed as backbone network on each frame independently. The input of the LGD-2D module consists of a plurality of non-consecutive video frames, and the global path learns the a holistic representation of these non-consecutive video frames. It should be noted that the initial local feature map $x_1$ is achieved by a single local transformation function $\mathcal{F}$ applied on the inputted frames. Moreover, the initial global feature vector $g_1 = \mathcal{P}(x_1)$ is a global average of $x_1$.

Step 605, inputting the local representation and the global representation of the to-be-recognized video into the local and global combination classifier, to synthesize a combined representation of the to-be-recognized video.

Step 606, inputting the combined representation of the to-be-recognized video into a fully connected layer, to obtain a category of the to-be-recognized video.

In this embodiment, the operations of steps 605-606 are already described in detail in steps 303-304 in the embodiment shown in FIG. 3, which will not be repeatedly described here.

It can be seen from FIG. 6 that, as compared with the embodiment corresponding to FIG. 3, the flow 600 of the method for recognizing a video in this embodiment emphasizes the step of recognizing the video. Here, in the scheme described in this embodiment, LGD-2D modules are used to learn the local representation and the global representation of the non-consecutive video frames in parallel, to obtain the local representation and the global representation of the video.

Figure 8:
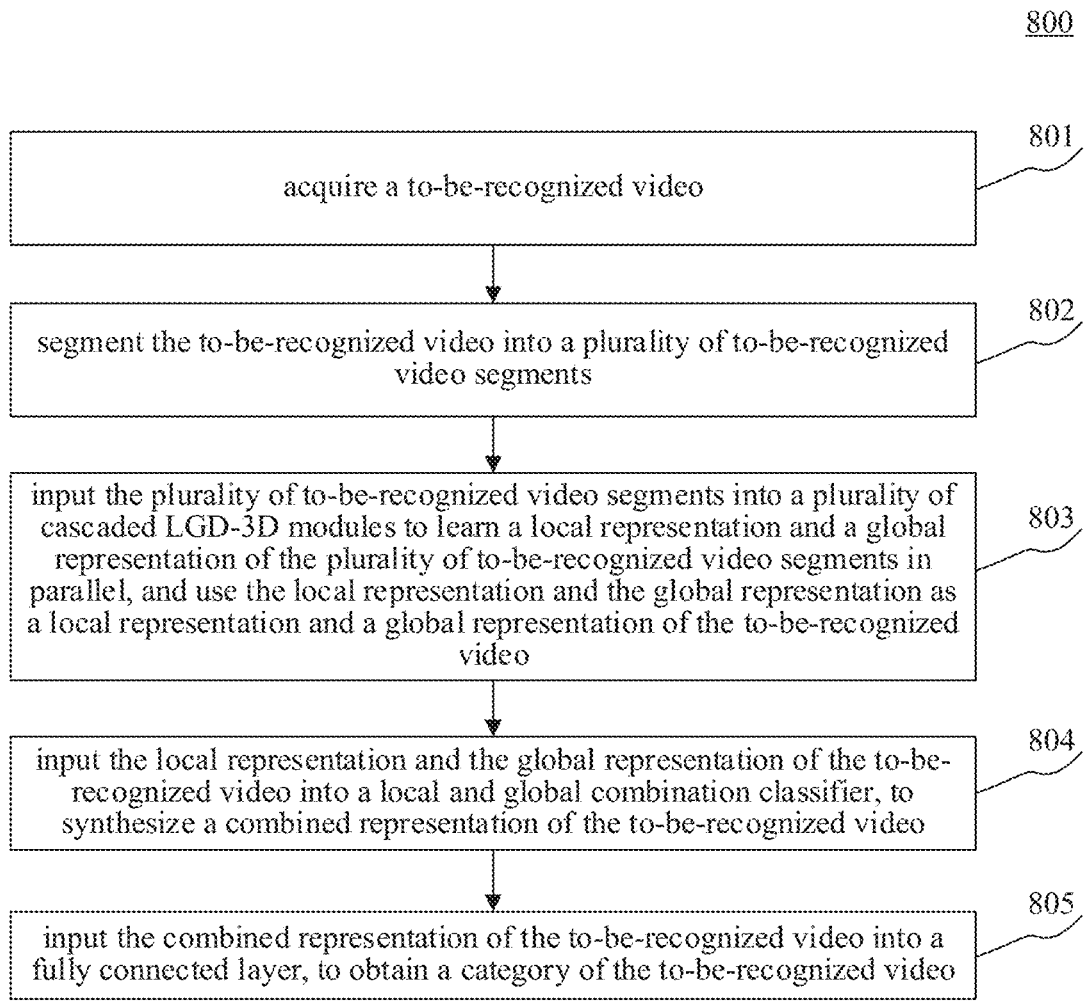
FIG. 8 is a flowchart of another embodiment of the method for recognizing a video according to the present disclosure.

Further referring to FIG. 8, FIG. 8 illustrates a flow 800 of the method for recognizing a video according to another embodiment of the present disclosure.

Figure 9:
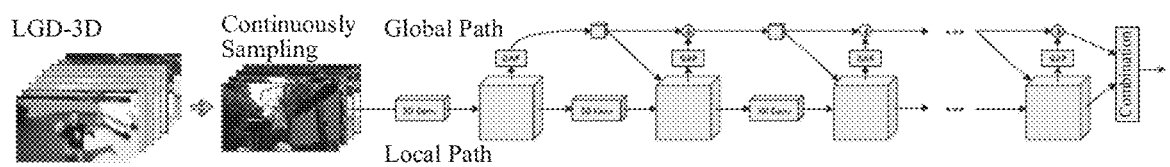
FIG. 9 is a schematic structural diagram of an LGD-3D module.

In this embodiment, an LGD model may include a plurality of cascaded LGD modules, a local and global combination classifier and a fully connected layer. Here, each LGD module is an LGD-3D module. For ease of understanding, FIG. 9 is a schematic structural diagram of a plurality of cascaded LGD-3D modules.

In this embodiment, the method for recognizing a video may include the following steps:

Step 801, acquiring a to-be-recognized video.

In this embodiment, the operation of step 801 is already described in detail in step 301 in the embodiment shown in FIG. 3, which will not be repeatedly described here.

Step 802, segmenting the to-be-recognized video into a plurality of to-be-recognized video segments.

In this embodiment, an executing body (e.g., the server 103 shown in FIG. 1) of the method for recognizing a video may segment the to-be-recognized video into the plurality of to-be-recognized video segments.

Step 803, inputting the plurality of to-be-recognized video segments into a plurality of cascaded LGD-3D modules to learn a local representation and a global representation of the plurality of to-be-recognized video segments in parallel, and using the local representation and the global representation as a local representation and a global representation of the to-be-recognized video.

In this embodiment, the above executing body may input the plurality of to-be-recognized video segments into the plurality of cascaded LGD-3D modules to learn the local representation and the global representation of the plurality of to-be-recognized video segments in parallel, and use the learned local representation and global representation as the local representation and the global representation of the to-be-recognized video.

Here, an other major branch of video representation learning is a 3D CNN. According to the common settings of the 3D CNN, the plurality of to-be-recognized video segments are inputted into the LGD-3D modules, and 3D convolution is used as the local transformation function $\mathcal{F}$. However, the training of 3D CNN is computationally expensive and the model size of 3D CNN is larger than that of 2D CNN. Therefore, pseudo three-dimensional convolution is chose, and three-dimensional learning is decomposed into a two-dimensional convolution in spatial space and a one-dimensional operation in a temporal dimension.

Here, taking an LGD-3D based on the ResNet-50 backbone as an example, the LGD-3D firstly replaces each 3×3 convolution kernel in original ResNet-50 with one 1×3×3 spatial convolution and 3×1×1 temporal convolution, and then constructs a LGD module based on each residual unit. All the weights of spatial convolutions may be initialized from the pre-trained ResNet-50 model, and the dimension of input video segment is set to 16×112×112 consisting of 16 consecutive frames with resolution 112×112. Through two maximum pooling layers and two time steps, the length of the video segment will be reduced twice by two max pooling layers with temporal stride of 2. Thus, the computational cost and training time thus can be effectively reduced by the small input resolution and the temporal pooling. The final local representation with dimension 4×7×7 is combined with global representation by the kernel-based classifier. This architecture can be easily extended to ResNet-101 network or deeper network by repeating more LGD modules.

Here, in consideration of the difficulty in training the whole network from scratch by kernel-based classifier, a two-stage strategy for training the LGD model is proposed, which is described as follows:

First, in a first stage, at the beginning of the training, a basic network is optimized without the combination classifier, and local and global representations are adjusted. Here, an optimization function may be given as:

$$\mathcal{L}_{w_g}(g_L, \mathcal{L}) + \mathcal{Y}_{w_x}(\mathcal{P}(x_L), \mathcal{Y}).$$

Here, $\{x_L, g_L\}$ denotes the final output pair of an inputted video. $\mathcal{Y}$ denotes the category of the inputted video. $\mathcal{L}_W$ denotes the softmax cross-entropy loss with projection matrix W. The overall loss includes a classification error from global representation and a classification error from local representation after local average pooling.

Then, in a second stage, after the basic network is trained, the loss of the overall network is tuned to:

$$\mathcal{L}_{w_e}(\phi(\{x_L, g_L\}), y).$$

Here, $\phi(\cdot)$ is the feature mapping.

Step 804, inputting the local representation and the global representation of the to-be-recognized video into a local and global combination classifier, to synthesize a combined representation of the to-be-recognized video.

Step 805, inputting the combined representation of the to-be-recognized video into a fully connected layer, to obtain a category of the to-be-recognized video.

In this embodiment, the operations of steps 804-805 are already described in detail in steps 303-304 in the embodiment shown in FIG. 3, which will not be repeatedly described here.

It can be seen from FIG. 8 that, as compared with the embodiment corresponding to FIG. 3, the flow 800 of the method for recognizing a video in this embodiment emphasizes the step of recognizing the video. Here, in the scheme described in this embodiment, the LGD-3D modules are used to learn the local representation and the global representation of the video segments in parallel, to obtain the local representation and the global representation of the video.

Figure 10:
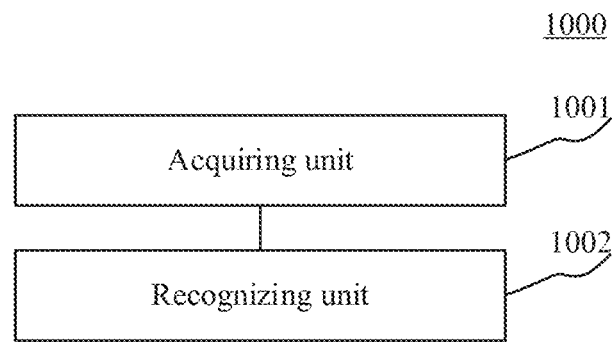
FIG. 10 is a schematic structural diagram of an embodiment of an apparatus for recognizing a video according to the present disclosure.

Further referring to FIG. 10, as an implementation of the method shown in the above drawings, an embodiment of the present disclosure provides an apparatus for recognizing a video. The embodiment of the apparatus corresponds to the embodiment of the method shown in FIG. 2. The apparatus may be applied in various electronic devices.

As shown in FIG. 10, the apparatus 1000 for recognizing a video in this embodiment may comprise: an acquiring unit 1001 and a recognizing unit 1002. Here, the acquiring unit 1001 is configured to acquire a to-be-recognized video. The recognizing unit 1002 is configured to input the to-be-recognized video into a pre-trained local and global diffusion (LGD) model to obtain a category of the to-be-recognized video. Here, the LGD model learns a spatio-temporal representation of the to-be-recognized video based on diffusion between a local representation and a global representation.

In this embodiment, for processes of the acquiring unit 1001 and the recognizing unit 1002 in the apparatus 1000 for recognizing a video, and their technical effects, reference may be respectively made to relative descriptions of step 201 and step 202 in the corresponding embodiment of FIG. 2, which will not be repeatedly described here.

In some alternative implementations of this embodiment, the LGD model includes a plurality of cascaded LGD modules, a local and global combination classifier and a fully connected layer.

In some alternative implementations of this embodiment, each LGD module includes a local path and a global path that interact with each other, respectively describing local variation and holistic appearance at each spatio-temporal location.

In some alternative implementations of this embodiment, diffusion directions in the each LGD module comprise a global-to-local diffusion direction and a local-to-global diffusion direction, wherein, in the global-to-local diffusion direction, a local feature map at a current LGD module is learned based on a local feature map at a preceding LGD module and a global feature vector at the preceding LGD module, and in the local-to-global diffusion direction, a global feature vector at the current LGD module is learned based on the local feature map at the current LGD module and the global feature vector at the preceding LGD module.

In some alternative implementations of this embodiment, learning the local feature map at the current LGD module based on the local feature map at the preceding LGD module and the global feature vector at the preceding LGD module includes: attaching a residual value of a global path at the preceding LGD module to the local feature map at the preceding LGD module, to generate the local feature map at the current LGD module. Learning the global feature vector at the current LGD module based on the local feature map at the current LGD module and the global feature vector at the preceding LGD module includes: embedding linearly the global feature vector at the preceding LGD module and global average pooling of the local feature map at the current LGD module, to generate the global feature vector at the current LGD module.

In some alternative implementations of this embodiment, the each LGD module generates a local feature map and a global feature vector through at least three projection matrices, and uses a low-rank approximation of each projection matrix to reduce a number of additional parameters of the LGD module.

In some alternative implementations of this embodiment, the recognizing unit 1002 comprises: a learning sub-unit (not shown), configured to learn the local representation and the global representation of the to-be-recognized video in parallel based on the to-be-recognized video and the plurality of cascaded LGD modules; a synthesizing sub-unit (not shown), configured to input the local representation and the global representation of the to-be-recognized video into the local and global combination classifier, to synthesize a combined representation of the to-be-recognized video; and a recognizing sub-unit (not shown), configured to input the combined representation of the to-be-recognized video into the fully connected layer, to obtain the category of the to-be-recognized video.

In some alternative implementations of this embodiment, the each LGD module is an LGD-2D module or an LGD-3D module.

In some alternative implementations of this embodiment, the learning sub-unit is further configured to: segment the to-be-recognized video into a plurality of to-be-recognized video segments; select a plurality of to-be-recognized video frames from the plurality of to-be-recognized video segments; and input the plurality of to-be-recognized video frames into a plurality of cascaded LGD-2D modules to learn a local representation and a global representation of the plurality of to-be-recognized video frames in parallel, and using the learned local representation and global representation as the local representation and the global representation of the to-be-recognized video.

In some alternative implementations of this embodiment, selecting at least one to-be-recognized video frame from each to-be-recognized video segment in the plurality of to-be-recognized video segments.

In some alternative implementations of this embodiment, the learning sub-unit is further configured to: segment the to-be-recognized video into a plurality of to-be-recognized video segments; and input the plurality of to-be-recognized video segments into a plurality of cascaded LGD-3D modules to learn a local representation and a global representation of the plurality of to-be-recognized video segments in parallel, and using the learned local representation and global representation as the local representation and the global representation of the to-be-recognized video.

In some alternative implementations of this embodiment, the plurality of cascaded LGD-3D modules decompose three-dimensional learning into two-dimensional convolutions in a spatial space and one-dimensional operations in a temporal dimension.

In some alternative implementations of this embodiment, the local and global combination classifier is a kernel-based classifier.

Figure 11:
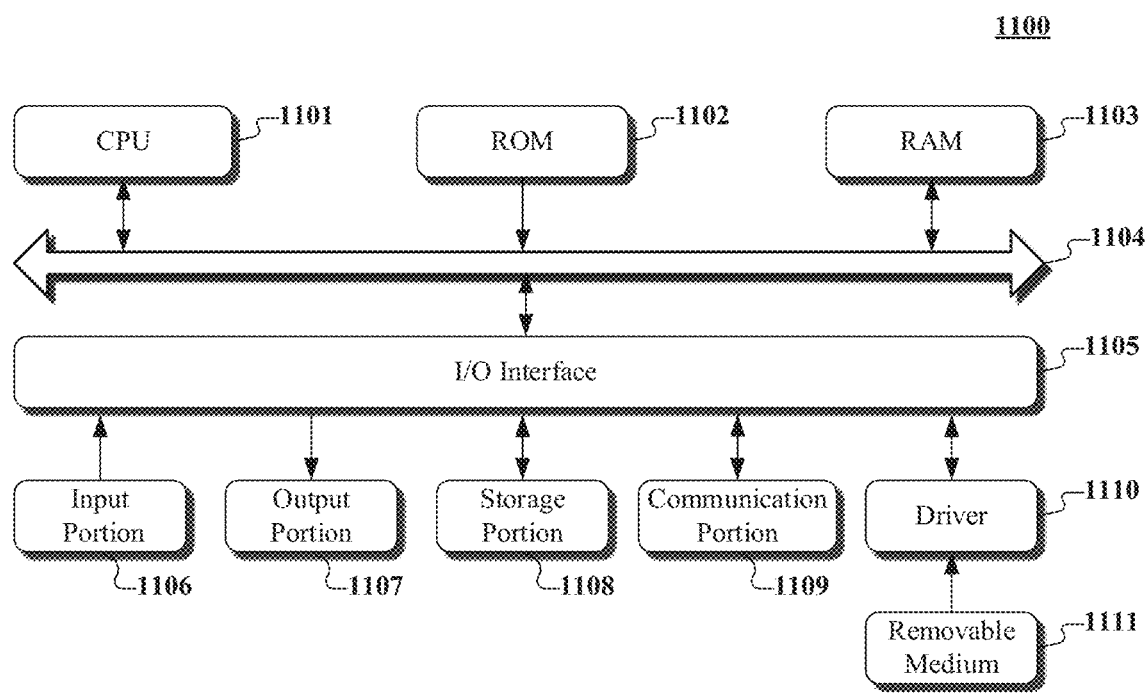
FIG. 11 is a schematic structural diagram of a computer system of a server adapted to implement embodiments of the present disclosure.

Referring to FIG. 11, FIG. 11 is a schematic structural diagram of a computer system 1100 of a server (the server 103 shown in FIG. 1) adapted to implement embodiments of the present disclosure. The server shown in FIG. 11 is merely an example, and should not bring any limitation to the functions and the scope of use of the embodiments of the present disclosure.

As shown in FIG. 11, the computer system 1100 includes a central processing unit (CPU) 1101, which may execute various appropriate actions and processes in accordance with a program stored in a read-only memory (ROM) 1102 or a program loaded into a random access memory (RAM) 1103 from a storage portion 1108. The RAM 1103 further stores various programs and data required by operations of the system 1100. The CPU 1101, the ROM 1102 and the RAM 1103 are connected to each other through a bus 1104. An input/output (I/O) interface 1105 is also connected to the bus 1104.

The following components are connected to the I/O interface 1105: an input portion 1106 including a keyboard, a mouse etc.; an output portion 1107 comprising a cathode ray tube (CRT), a liquid crystal display device (LCD), a speaker etc.; a storage portion 1108 including a hard disk and the like; and a communication portion 1109 comprising a network interface card, such as a LAN card and a modem. The communication portion 1109 performs communication processes via a network, such as the Internet. A driver 1110 is also connected to the I/O interface 1105 as required. A removable medium 1111, such as a magnetic disk, an optical disk, a magneto-optical disk, and a semiconductor memory, may be installed on the driver 1110, to facilitate the retrieval of a computer program from the removable medium 1111, and the installation thereof on the storage portion 1108 as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 1109, and/or may be installed from the removable medium 1111. The computer program, when executed by the central processing unit (CPU) 701, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in embodiments of the present disclosure may be implemented by means of software or hardware. The described units or modules may also be provided in a processor, for example, described as: a processor, comprising an acquiring unit and a recognizing unit, where the names of these units or modules do not in some cases constitute a limitation to such units or modules themselves. For example, the acquiring unit may also be described as "a unit for acquiring to-be-recognizing unit."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire a to-be-recognized video; and input the to-be-recognized video into a pre-trained local and global diffusion (LGD) model to obtain a category of the to-be-recognized video, the LGD model learning a spatio-temporal representation in the to-be-recognized video based on diffusion between a local representation and a global representation.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for recognizing a video, comprising:
   acquiring a to-be-recognized video; and
   inputting the to-be-recognized video into a pre-trained local and global diffusion (LGD) model to obtain a category of the to-be-recognized video, the LGD model learning a spatio-temporal representation in the to-be-recognized video based on diffusion between a local representation and a global representation.

2. The method according to claim 1, wherein the LGD model comprises a plurality of cascaded LGD modules, a local and global combination classifier and a fully connected layer.

3. The method according to claim 2, wherein each LGD module comprises a local path and a global path interacting with each other, respectively describing local variation and holistic appearance at each spatio-temporal location.

4. The method according to claim 3, wherein diffusion directions in the each LGD module comprise a global-to-local diffusion direction and a local-to-global diffusion direction, wherein, in the global-to-local diffusion direction, a local feature map at a current LGD module is learned based on a local feature map at a preceding LGD module and a global feature vector at the preceding LGD module, and in the local-to-global diffusion direction, a global feature vector at the current LGD module is learned based on the local feature map at the current LGD module and the global feature vector at the preceding LGD module.

5. The method according to claim 4, wherein learning the local feature map at the current LGD module based on the local feature map at the preceding LGD module and the global feature vector at the preceding LGD module comprises:
   attaching a residual value of a global path at the preceding LGD module to the local feature map at the preceding LGD module, to generate the local feature map at the current LGD module,
   wherein learning the global feature vector at the current LGD module based on the local feature map at the current LGD module and the global feature vector at the preceding LGD module comprises:
   embedding linearly the global feature vector at the preceding LGD module and global average pooling of the local feature map at the current LGD module, to generate the global feature vector at the current LGD module.

6. The method according to claim 5, wherein the each LGD module generates a local feature map and a global feature vector through at least three projection matrices, and uses a low-rank approximation of each projection matrix to reduce a number of additional parameters of the LGD module.

7. The method according to claim 2, wherein the inputting the to-be-recognized video into the pre-trained local and global diffusion (LGD) model to obtain the category of the to-be-recognized video comprises:
　　learning the local representation and the global representation of the to-be-recognized video in parallel based on the to-be-recognized video and the plurality of cascaded LGD modules;
　　inputting the local representation and the global representation of the to-be-recognized video into the local and global combination classifier, to synthesize a combined representation of the to-be-recognized video; and
　　inputting the combined representation of the to-be-recognized video into the fully connected layer, to obtain the category of the to-be-recognized video.

8. The method according to claim 7, wherein the each LGD module is a two-dimensional LGD (LGD-2D) module or a three-dimensional LGD (LGD-3D) module.

9. The method according to claim 8, wherein the learning the local representation and the global representation of the to-be-recognized video in parallel based on the to-be-recognized video and the plurality of cascaded LGD modules comprises:
　　segmenting the to-be-recognized video into a plurality of to-be-recognized video segments;
　　selecting a plurality of to-be-recognized video frames from the plurality of to-be-recognized video segments; and
　　inputting the plurality of to-be-recognized video frames into a plurality of cascaded LGD-2D modules to learn a local representation and a global representation of the plurality of to-be-recognized video frames in parallel, and using the learned local representation and global representation as the local representation and the global representation of the to-be-recognized video.

10. The method according to claim 9, wherein selecting at least one to-be-recognized video frame from each to-be-recognized video segment in the plurality of to-be-recognized video segments.

11. The method according to claim 8, wherein the learning the local representation and the global representation of the to-be-recognized video in parallel based on the to-be-recognized video and the plurality of cascaded LGD modules comprises:
　　segmenting the to-be-recognized video into a plurality of to-be-recognized video segments; and
　　inputting the plurality of to-be-recognized video segments into a plurality of cascaded LGD-3D modules to learn a local representation and a global representation of the plurality of to-be-recognized video segments in parallel, and using the learned local representation and global representation as the local representation and the global representation of the to-be-recognized video.

12. The method according to claim 11, wherein
　　the plurality of cascaded LGD-3D modules decompose three-dimensional learning into two-dimensional convolutions in a spatial space and one-dimensional operations in a temporal dimension.

13. The method according to claim 2, wherein the local and global combination classifier is a kernel-based classifier.

14. A server, comprising:
　　one or more processors; and
　　a storage apparatus, configured to store one or more programs,
　　wherein the one or more programs, when executed by the one or more processors, cause the one or more processors to implement operations, the operations comprising:
　　acquiring a to-be-recognized video; and
　　inputting the to-be-recognized video into a pre-trained local and global diffusion (LGD) model to obtain a category of the to-be-recognized video, the LGD model learning a spatio-temporal representation in the to-be-recognized video based on diffusion between a local representation and a global representation.

15. A computer readable medium, storing a computer program thereon, wherein the computer program, when executed by a processor, cause the processor to implement operations, the operations comprising:
　　acquiring a to-be-recognized video; and
　　inputting the to-be-recognized video into a pre-trained local and global diffusion (LGD) model to obtain a category of the to-be-recognized video, the LGD model learning a spatio-temporal representation in the to-be-recognized video based on diffusion between a local representation and a global representation.

16. The server according to claim 14, wherein the LGD model comprises a plurality of cascaded LGD modules, a local and global combination classifier and a fully connected layer.

17. The server according to claim 16, wherein each LGD module comprises a local path and a global path interacting with each other, respectively describing local variation and holistic appearance at each spatio-temporal location.

18. The server according to claim 17, wherein diffusion directions in the each LGD module comprise a global-to-local diffusion direction and a local-to-global diffusion direction, wherein, in the global-to-local diffusion direction, a local feature map at a current LGD module is learned based on a local feature map at a preceding LGD module and a global feature vector at the preceding LGD module, and in the local-to-global diffusion direction, a global feature vector at the current LGD module is learned based on the local feature map at the current LGD module and the global feature vector at the preceding LGD module.

19. The server according to claim 18, wherein learning the local feature map at the current LGD module based on the local feature map at the preceding LGD module and the global feature vector at the preceding LGD module comprises:
　　attaching a residual value of a global path at the preceding LGD module to the local feature map at the preceding LGD module, to generate the local feature map at the current LGD module,
　　wherein learning the global feature vector at the current LGD module based on the local feature map at the current LGD module and the global feature vector at the preceding LGD module comprises:
　　embedding linearly the global feature vector at the preceding LGD module and global average pooling of the local feature map at the current LGD module, to generate the global feature vector at the current LGD module.

\* \* \* \* \*